(12) United States Patent
Annamraju et al.

(10) Patent No.: US 10,728,563 B2
(45) Date of Patent: Jul. 28, 2020

(54) DATA STREAM ENCODER CONFIGURATION

(71) Applicant: Imagination Technologies Limited, Kings Langley (GB)

(72) Inventors: Venu Annamraju, Hyderabad (IN); Harish Rajamani, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 1476 days.

(21) Appl. No.: 14/571,477

(22) Filed: Dec. 16, 2014

(65) Prior Publication Data

US 2015/0172691 A1 Jun. 18, 2015

(30) Foreign Application Priority Data

Dec. 16, 2013 (GB) .................................. 1322214.6
Aug. 8, 2014 (GB) .................................. 1414080.0

(51) Int. Cl.
| | | |
|---|---|---|
| *H04N 7/24* | (2011.01) | |
| *H04N 11/02* | (2006.01) | |
| *H04N 7/12* | (2006.01) | |
| *H04N 19/33* | (2014.01) | |
| *H04N 19/117* | (2014.01) | |
| *H04N 19/80* | (2014.01) | |
| *H04N 19/85* | (2014.01) | |

(Continued)

(52) U.S. Cl.
CPC .......... *H04N 19/33* (2014.11); *H04N 19/117* (2014.11); *H04N 19/132* (2014.11); *H04N 19/172* (2014.11); *H04N 19/182* (2014.11); *H04N 19/186* (2014.11); *H04N 19/423* (2014.11); *H04N 19/463* (2014.11); *H04N 19/59* (2014.11); *H04N 19/60* (2014.11); *H04N 19/70* (2014.11); *H04N 19/80* (2014.11); *H04N 19/85* (2014.11)

(58) Field of Classification Search
CPC ...... H04N 19/33; H04N 19/70; H04N 19/423; H04N 19/182; H04N 19/186; H04N 19/132; H04N 19/172; H04N 19/59; H04N 19/60; H04N 19/463; H04N 19/85; H04N 19/80; H04N 19/117
USPC .......................................................... 375/240
See application file for complete search history.

(56) References Cited

U.S. PATENT DOCUMENTS

| | | |
|---|---|---|
| 2004/0071211 A1 | 4/2004 | Washino |
| 2005/0169544 A1 | 8/2005 | Clark |
| | (Continued) | |

FOREIGN PATENT DOCUMENTS

| | | |
|---|---|---|
| EP | 2429192 A1 | 3/2012 |
| WO | WO 2012/140839 A1 | 10/2012 |

*Primary Examiner* — Susan E. Hodges
(74) *Attorney, Agent, or Firm* — Potomac Law Group, PLLC; Vincent M DeLuca

(57) ABSTRACT

A media encoder for encoding a stream of media data blocks has an encoder pipeline including a sequence of processing modules for processing a stream of media data blocks, and a pipeline configurator configured to effect a switch in the encoder pipeline from one or more first encode parameters to one or more second encode parameters. The first processing module of the pipeline can be configured to associate a trigger value with at least a first media data block processed at the first processing module in accordance with second encode parameters, the trigger value passing to subsequent modules so as to cause those modules to adopt the second encode parameters.

16 Claims, 5 Drawing Sheets

(51) Int. Cl.
*H04N 19/70* (2014.01)
*H04N 19/172* (2014.01)
*H04N 19/132* (2014.01)
*H04N 19/186* (2014.01)
*H04N 19/182* (2014.01)
*H04N 19/423* (2014.01)
*H04N 19/59* (2014.01)
*H04N 19/60* (2014.01)
*H04N 19/463* (2014.01)

(56) References Cited

U.S. PATENT DOCUMENTS

2007/0074266 A1* 3/2007 Raveendran ........... H04N 5/144
 725/135
2011/0249742 A1* 10/2011 Price ..................... H04N 19/46
 375/240.16

* cited by examiner

DATA STREAM ENCODER CONFIGURATION

BACKGROUND OF THE INVENTION

This invention relates to a media encoder for encoding a stream of media data blocks.

During the real-time encoding of streaming media such as video and audio, it is often useful to be able to modify the configuration of the media encoder. This allows the encoder to adapt to changes in the processing resources available to the encoder and, in the case where the media is streamed over a network, the network conditions encountered by the stream between the transmitter and receiver. For example, in the case of video telephony over a network, a video stream can suffer from transient drops in network bandwidth which lead to buffer bloat problems in routers causing excessive buffering delays and/or packet loss if the encoder does not respond by dropping the bitrate at which the encoder generates the encoded media stream transmitted to the receiving device.

Conventionally, configuration changes or switches at a video encoder are achieved by flushing the encoder and immediately reconfiguring the encoder in accordance with a new encode configuration. However, such configuration switches are not seamless and result in disruption to the encoded video stream. Alternatively, a video encoder can be forced to immediately change its configuration without first flushing the encoder, but this leads to glitches in the encoded video stream, which would typically be observed in the decoded video stream as freezes and frame artefacts. This is because each video frame of a stream takes a finite amount of time to traverse the encoder. When the configuration switch is forced, one or more frames are likely to have been already partially processed under the old configuration; completing encoding of those frames according to a new configuration leads to glitches in the stream.

These issues are not limited to video encoders, with other types of media encoder facing similar problems.

Certain encoders also suffer from unacceptable latencies when performing dynamic switching of frame size. This can be due to the encoder being a software encoder supported at a hardware platform which itself is not optimised for performing frame size switches, or which is accessed by the software encoder by means of abstractions which are not optimised for performing frame size switches. For example, on the Android mobile platform, OpenMAX™ abstractions are used to interface a software encoder to the underlying hardware functionalities employed to perform aspects of media encoding. The use of OpenMAX™ abstractions leads to multiple state machine transitions when a dynamic switch of frame size is performed and, as result, excessive latency.

BRIEF SUMMARY OF THE INVENTION

According to a first aspect of the present invention there is provided a media encoder for encoding a stream of media data blocks, the media encoder comprising:
an encoder pipeline configured to process a stream of media data blocks in accordance with one or more first encode parameters, the encoder pipeline comprising a sequence of processing modules including a first processing module and one or more subsequent processing modules; and
a pipeline configurator configured to, in order to effect a switch in the encoder pipeline from the one or more first encode parameters to one or more second encode parameters, cause the subsequent processing modules of the pipeline to enter a trigger mode and cause the first processing module to adopt the second encode parameters;
the first processing module being configured to, on adopting the second encode parameters, associate a trigger value with at least a first media data block processed at the first processing module in accordance with the second encode parameters; and
in trigger mode, each of the subsequent processing modules being configured to, in response to receiving the trigger value, adopt the second encode parameters.

In embodiments of the invention, machine readable code can be provided for generating the media encoder. In embodiments of the invention, a machine readable storage medium having encoded thereon non-transitory machine readable code can be provided for generating the media encoder.

The first media data block may be the first media data block for processing at the first processing module in accordance with the second encode parameters.

The first processing module may be configured to, on being caused to adopt the second encode parameters, complete any current processing according to the first set of encode parameters and process the next media data block received for processing at the first processing module in accordance with the second set of encode parameters, that next media data block being the first media data block.

The pipeline configurator may be configured to cause the subsequent processing modules of the pipeline to enter their trigger modes prior to causing the first processing module to adopt the second encode parameters.

The pipeline configurator may be configured to cause the subsequent processing modules of the pipeline to enter their trigger modes in reverse order with respect to the order of the subsequent processing modules in the pipeline.

The pipeline configurator may be configured to, on causing the subsequent processing modules of the pipeline to enter a trigger mode, make available at least some of the second encode parameters to the subsequent modules.

The subsequent processing modules of the pipeline may be configured to cache the at least some of the second encode parameters for adoption on receiving the trigger value.

The pipeline configurator may be configured to, on causing the first processing module to adopt the second encode parameters, make available at least some of the second encode parameters to the first processing module.

The trigger value may be a state of a trigger flag toggleable between two or more states and:
the first processing module is configured to, on adopting the second encode parameters, toggle the state of the trigger flag from a first state to a second state and include the toggled trigger flag in the first and subsequent media data blocks of the stream; and
the subsequent modules are configured to, in trigger mode, maintain the state of the last received trigger flag and adopt the second encode parameters in response to receiving the trigger value only if the trigger value differs from the maintained state.

The first processing module may be configured to write the trigger value to the at least the first media data blocks or metadata associated with the at least the first media data blocks.

The first processing module may be a preprocessor for processing media data blocks prior to their encoding at an encoder of the encoder pipeline.

One or more of the subsequent modules may be an encoder for encoding media data blocks.

The media data blocks may be video frames and the first and second encode parameters may include one or more of frame size, frame rate and bitrate.

According to a second aspect of the present invention there is provided a method of switching encode configurations at an encoder pipeline adapted for processing a stream of media data blocks in accordance with one or more encode parameters, the encoder pipeline comprising a sequence of processing modules including a first processing module and one or more subsequent processing modules, the method comprising, in order to switch the encoder pipeline from one or more first encode parameters to one or more second encode parameters:
  causing the subsequent processing modules of the pipeline to enter a trigger mode;
  causing the first processing module of the pipeline to adopt the second encode parameters;
the first processing module, on adopting the second encode parameters:
  associating a trigger flag with at least a first media data block processed at the first processing module in accordance with the second encode parameters; and each of the subsequent processing modules in response to receiving the trigger flag associated with the first media data block:
  adopting the second encode parameters; and
  processing the first media data block in accordance with the second encode parameters.

Machine readable code may be provided for implementing the method of switching encode configurations at an encoder pipeline. A machine readable storage medium having encoded thereon non-transitory machine readable code may be provided for implementing the method of switching encode configurations at an encoder pipeline.

There is provided a frame processor for preparing a stream of video frames for encoding, the frame processor being arranged to receive a video frame having first pixel dimensions and comprising:
  a rescaling filter configured to rescale the received video frame such that the one or both first pixel dimensions are no greater than respective predetermined pixel dimension(s) and the aspect ratio of the received video frame is maintained; and
  a frame generator configured to:
    embed the rescaled video frame within an output video frame having the predetermined pixel dimensions; and
    mark pixels of the output video frame outside the bounds of the rescaled video frame as inactive;
the frame processor being arranged to provide the output video frame to a video encoder.

In embodiments of the invention, machine readable code can be provided for generating the frame processor. In embodiments of the invention, a machine readable storage medium having encoded thereon non-transitory machine readable code can be provided for generating the frame processor.

The rescaling filter may be configured to rescale the received video frame such that the one or both first pixel dimensions are equal to the respective predetermined pixel dimension(s).

The rescaling filter may be configured to rescale the received video frame such that the one or both first pixel dimensions are no greater than respective predetermined pixel dimension(s) in the case that one or both of the first pixel dimensions are greater than the respective predetermined pixel dimension(s) but not in the case that the first pixel dimensions are both equal to or less than the respective predetermined pixel dimension(s), said rescaled video frame being the received video frame in the case that the received video frame is not rescaled.

The rescaling filter may be a polyphase filter adapted to use a number of filter coefficients selected to be greater than or equal to the ratio of one of the first pixel dimensions to the respective predetermined pixel dimension, provided that the number of filter coefficients is a minimum of two.

The polyphase filter may be adapted to, for a received frame having a luma channel and subsampled chroma channels, use said selected number of filter coefficients for rescaling the luma channel and a respective integer number of filter coefficients for rescaling each of the chroma channels, each respective integer number of filter coefficients being determined from the selected number of filter coefficients divided by the subsampling ratio of the respective chroma channel.

The frame processor may be configured to set pixels of the output video frame outside the bounds of the rescaled video frame to a predetermined colour so as to mark those pixels as inactive.

The predetermined colour may be black.

The frame processor may be configured to write data to the video frame or its metadata, said data defining the position and dimensions of the rescaled video frame within the output video frame so as to mark pixels of the output video frame outside the bounds of the rescaled video frame as inactive.

The frame processor may be for use in an encoder pipeline having an encoder arranged to encode video frames output from the frame processor according to a video compression standard adapted to divide a video frame into macroblocks for processing, the frame processor being configured to align the rescaled video frame within the output video frame such that at least two adjacent boundaries of the rescaled video frame are coincident with a macroblock boundary.

The frame processor may be configured to, on each of the pixel dimensions of a rescaled video frame not being an integer multiple of the respective dimensions of the macroblocks, trim pixels from the rescaled video frame such that each of the pixel dimensions of the rescaled video frame are an integer multiple of the respective dimensions of the macroblocks.

The frame processor may be configured to maintain the orientation of the received video frame in the output frame with respect to the two dimensions of the received and output video frames.

There is provided a method of preparing video frames for encoding at a video encoder, the method comprising:
  receiving a video frame having first pixel dimensions;
  rescaling the received video frame such that the one or both first pixel dimensions are no greater than respective predetermined pixel dimension(s) and the aspect ratio of the received video frame is maintained;
  embedding the rescaled video frame within an output video frame having the predetermined pixel dimensions;
  marking pixels of the output video frame outside the bounds of the rescaled video frame as inactive; and
  providing the output video frame to a video encoder.

The rescaling step may be performed if one or both of the first pixel dimensions are greater than the respective predetermined pixel dimension(s) but not if the first pixel dimensions are both equal to or less than the respective predetermined pixel dimension(s), said rescaled video frame being the received video frame if the rescaling step is not performed.

Machine readable code may be provided for implementing the method of preparing video frames. A machine readable storage medium having encoded thereon non-transitory machine readable code may be provided for implementing the method of preparing video frames.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable any person skilled in the art to make and use the invention. The present invention is not limited to the embodiments described herein and various modifications to the disclosed embodiments will be readily apparent to those skilled in the art.

There is a need for a media encoder that provides improved performance under dynamic switching of encode configuration, and which can address the issue of slow dynamic switching on affected encoder platforms.

A media encoder is provided having a pipeline configurator arranged to effect a configuration switch at a pipeline of the encoder. The pipeline configurator can accurately perform a configuration switch at the pipeline such that each processing module of the pipeline switches its configuration at the correct block of media data (referred to herein as a media buffer).

Figure 1:
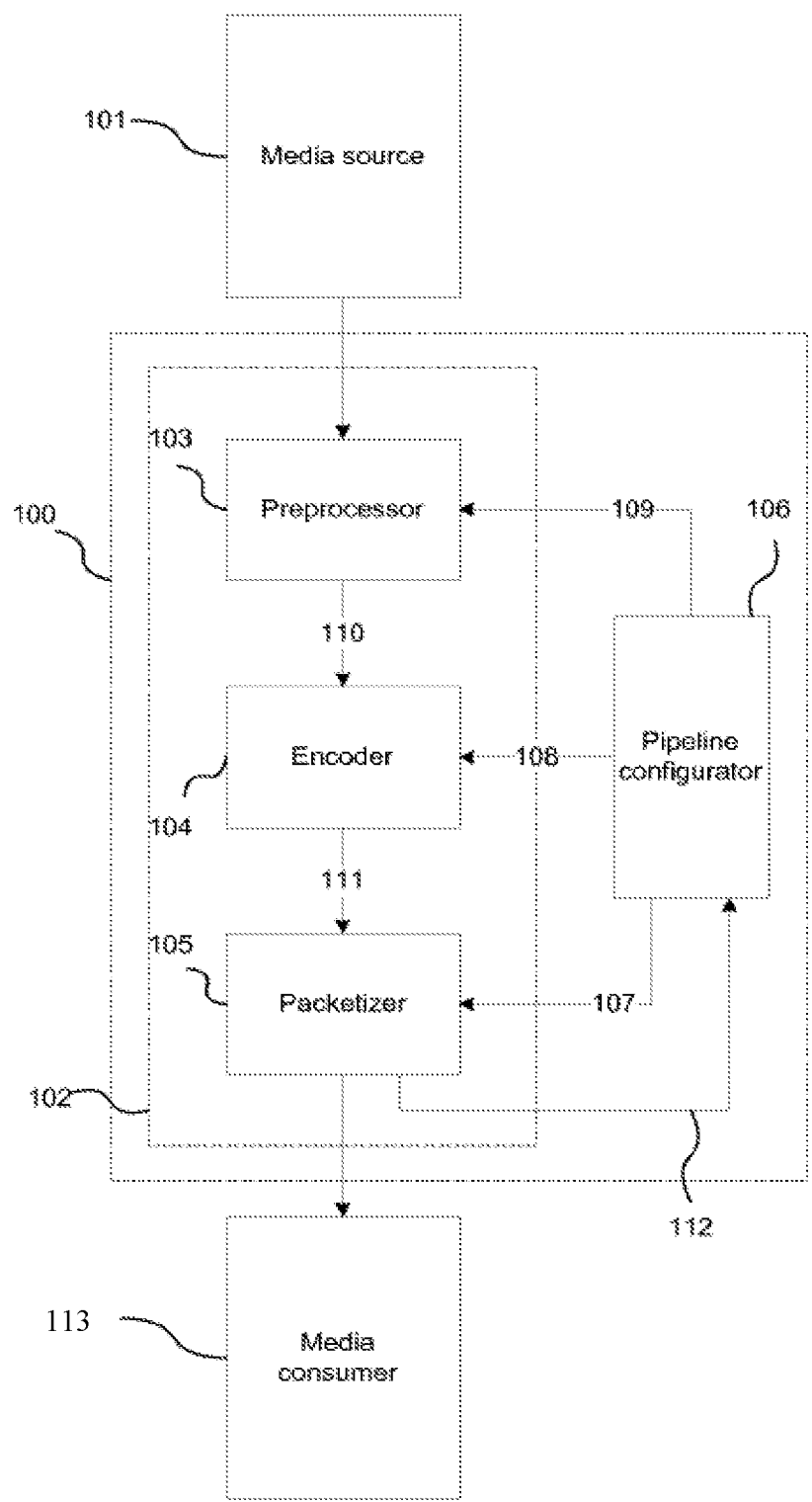
FIG. 1 is a schematic diagram of a media encoder comprising an encoder pipeline and pipeline configurator.

A schematic diagram of a media encoder 100 is shown in FIG. 1. The media encoder comprises an encoder pipeline 102 having a plurality of processing modules. One of the processing modules is an encoder module 104 for encoding a stream of media buffers from a media source 101. The encoder pipeline includes two other processing modules: a preprocessor 103 and a packetizer 105. The preprocessor performs processing of media buffers prior to encoding, and the packetizer forms the encoded media stream generated at the encoder module into data packets. More generally there could be more than one encoder module and there could be any number of other processing modules, which may or may not include an optional preprocessor and optional packetizer.

The media encoder further comprises a pipeline configurator 106 capable of signalling to at least some of the processing modules of the pipeline 102. In FIG. 1, the pipeline configurator is capable of signalling to each of the preprocessor (indicated by signal line 109), encoder module (indicated by signal line 108) and packetizer (indicated by signal line 107). The pipeline configurator may be further capable of receiving signals from one or more of the processing modules, as indicated by return signalling path 112.

FIG. 1 shows the media encoder in context in a data processing system, the media encoder being arranged between a media source 101 and a media consumer 113. The media encoder receives a media stream comprising a sequence of buffers from the media source and provides an encoded media stream to the media consumer. The media stream could be any kind of media stream, such as a video and/or audio stream.

The encoder pipeline is configured to perform encoding of media buffers in accordance with one or more encode parameters. These parameters determine, for a given source media stream, the nature of the encoding performed by the encoder. For example, the encode parameters could define the encoding format to be used, a target bitrate, a level of compression, and/or settings particular to the encoding format in use at the media encoder. In the event the media stream is a video stream, the encode parameters could include, for example, a video format, a frame size, a target frame rate, a bitrate, and an output packet size.

The media encoder will now be described by way of example in which the media source is a camera providing a stream of video frames (the media buffers) and the media consumer is a transmitter for transmitting the encoded and packetized media stream generated by the encoder over a network in a series of network packets. Such an arrangement might, for instance, be employed at a device configured to perform encoding of video frames for real-time video telephony. In other embodiments, the media source could be, for example, a data store from which a sequence of data buffers representing a media stream is played-out, an entity for synthesizing a media stream, or a receiver arranged to provide a sequence of data buffers received over a network. And the media consumer could alternatively be, for example, a data store for storing the encoded media stream, or a display system for displaying the encoded data stream. These are non-exhaustive lists of examples and in general the media source and media consumer can be any suitable source and consumer (respectively) of media frames.

The pipeline configurator is configured to dynamically switch the configuration of the encoder pipeline during encoding by updating the encode parameters in accordance with which the pipeline is performing encoding of an incoming media stream. Such reconfigurations of the encoder pipeline would typically be driven by decisions to adapt encoding in accordance with one or more adaptation algorithms of the media encoder or of the data processing system at which the media encoder is supported. For example, adaptation can be desirable in response to changes in the resources available to the media encoder, to changes in the network conditions over which the encoded media stream is being transmitted, and to changes in the incoming media stream.

Changes in encoder configuration might also be initiated by the modification of encoder pipeline settings by a user, or by commands from other software or hardware components of a data processing system at which the media encoder is supported.

The aspects of the pipeline configurator that are described herein are concerned with the mechanism by which a configuration switch of an encoder pipeline is effected; why that configuration switch is performed is not relevant. However, the pipeline configurator could in fact play a role in determining when a configuration switch is to be performed. For example, the pipeline configurator could form part of an adaptation controller configured to adapt the encoding performed at the encoder pipeline to changes in the load on that pipeline.

As has been mentioned, the encoder pipeline performs encoding in accordance with a set of one or more encode parameters. Modules of the encoder pipeline might each require a different subset of the total set of encode parameters provided to the pipeline. For example, in order to perform its processing functions, the preprocessor might only require parameters describing the pixel dimensions to which incoming frames are to be rescaled, whilst the packetizer might only require a parameter describing a packet size into which the encoded media stream from the encoder module is to be formed. Some of the modules of the encoder pipeline might not receive any encode parameters: for example, modules whose function is fixed and that process frames in a manner which does not depend on any of the encode parameters.

In order to effect a configuration switch of the encoder pipeline during encoding of a media stream (e.g. in response to the output of an adaptation algorithm), the components of the media encoder perform the following mechanism. This mechanism switches the configuration of the encoder pipeline from its current encode parameters to updated encode parameters.

The pipeline configurator signals to the processing modules in the encoder pipeline that are subsequent to the first processing module in the pipeline (the encoder and packetizer in this example) so as to cause those subsequent modules to enter a trigger mode. In trigger mode, a module is waiting for a media frame having an associated trigger flag that indicates to the module to switch from the current to the updated encode parameters. The pipeline configurator also signals to the first processing module in the encoder pipeline (the preprocessor in this example) so as to cause the first module to enter an immediate mode. In immediate mode, the preprocessor adopts the updated encode parameters (or at least those of the updated encode parameters which apply to it) such that the preprocessor processes the next frame in accordance with the updated encode parameters. Thus, if the preprocessor is processing a frame when it receives a signal to enter immediate mode, the preprocessor completes processing of that frame according to the current encode parameters. The processing of subsequent frames in the media stream is then performed according to the updated encode parameters.

Generally, the first processing module in the pipeline is the module that first receives frames from the media source—that is, of the set of modules that are arranged to receive signals from the pipeline configurator (there could be one or more initial modules prior to the first processing module in the pipeline whose function is fixed and does not depend on any encode parameters). The processing modules in the pipeline subsequent to the first processing module are those other than the first processing module which are arranged to receive signals from the pipeline configurator.

The first frame processed by the preprocessor according to the updated encode parameters is associated with a trigger flag so as to indicate to downstream modules of the pipeline (which are in trigger mode) when to switch encode configurations.

The trigger flag could be carried in the frame data, such as in metadata of the frame (e.g. a header), or could be provided in data associated with the frame that passes along the pipeline with the frame. Once the preprocessor has adopted the updated encode parameters and set the associated trigger flag, the preprocessor can exit immediate mode.

In trigger mode, the encoder and packetizer are waiting to make the switch from the current encode parameters to the updated encode parameters. On receiving a media frame with a trigger flag, the encoder and packetizer immediately switch configurations so as to process that frame according to the updated encode parameters. The first frame processed at the preprocessor according to the updated encode configuration passes along the pipeline in order through the modules (indicated by signal lines 110 and 111) so the encoder will receive the trigger flag and switch configurations before the packetizer. On each of the encoder and packetizer receiving the trigger flag and adopting the updated encode parameters, the respective module can exit trigger mode.

By using the mechanism described herein, the configuration switch at each module of the pipeline will occur precisely at a single frame such that all frames of the media stream from that frame are processed according to the updated encode parameters and all frames of the media stream up to that frame are processed according to the previous set of encode parameters. The dynamic switching of encode parameters during encoding is therefore seamless, with no frames being processed by some modules according to one set of encode parameters and by other modules according to another set of encode parameters. As a result, a viewer of the encoded media stream generated by the media encoder will not notice any glitches or freezing during play-out.

The trigger flag could be any suitable identifier in a frame or in metadata associated with a frame. For example, the flag could be a pattern of bits anywhere in the data representing a frame, a field in a header of the frame, a field in a footer of the frame, or data associated with a frame that passes along the pipeline with its associated frame.

It can be advantageous to configure the pipeline configurator to cause the subsequent modules in the pipeline to enter trigger mode prior to causing the first module in the pipeline to enter immediate mode. This could be achieved by the pipeline configurator signalling to the subsequent modules in the pipeline to enter trigger mode before signalling to the first module in the pipeline to enter immediate mode. It can be further advantageous to configure the pipeline configurator to cause the subsequent modules in the pipeline to enter trigger mode in reverse order with respect to their order in the pipeline. For example, referring to FIG. 1, the pipeline configurator would be arranged to signal the packetizer before signalling the encode module. These features can help to ensure that the subsequent modules in the pipeline are ready to switch from the current to the updated encode configuration when the first module switches encode configurations.

Figure 2:
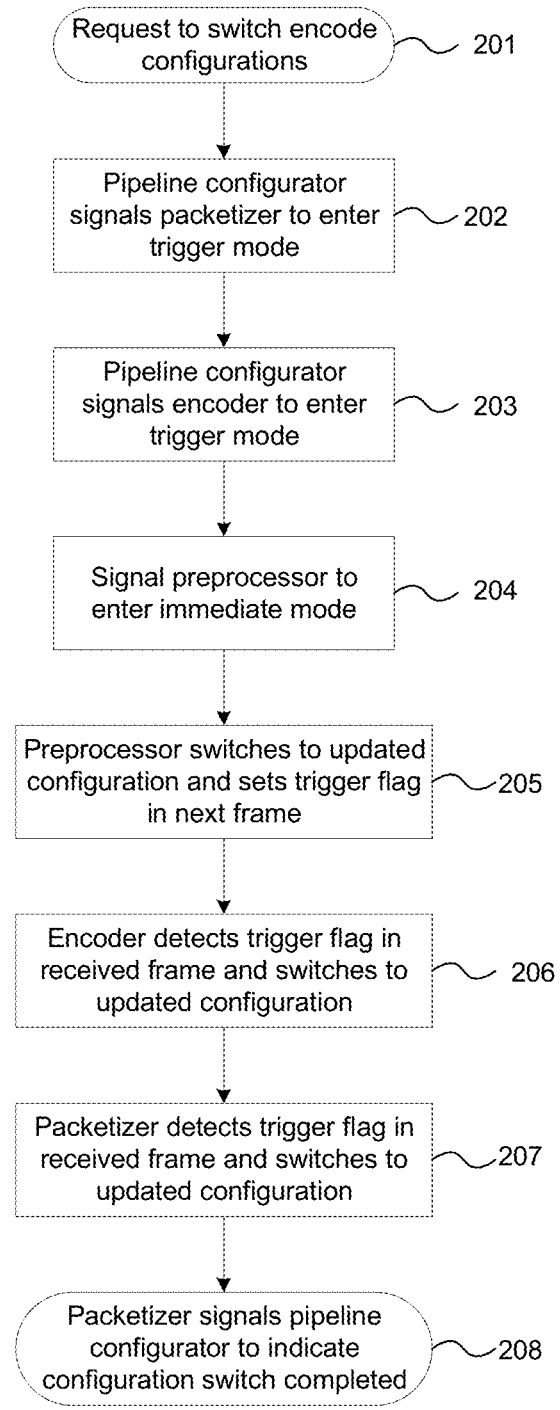
FIG. 2 is a flow diagram of a dynamic configuration switch at a media encoder.

By way of a particular example of the operation of the media encoder on switching between particular encode configurations, consider the encoder pipeline of FIG. 1 switching from encoding video frames according to H.264 standard with the following initial encode parameters:

Pixel dimensions: 640×480
Frame rate: 30 fps
Bitrate: 512 kbps
NAL Size: 1024 bytes (Network Abstraction Layer parameter)
Maximum Packet size: 1200 bytes to the following updated encode parameters:

Pixel dimensions: 320×240
Frame rate: 20 fps
Birate: 256 kbps
NAL Size: 550 bytes
Maximum Packet size: 600 bytes With reference to FIG. 2, which is a flowchart summarising the method performed by the media encoder, the encoder pipeline of the present example is arranged to switch from the initial to updated encode parameters as follows. Such a configuration change might be requested (201) by an adaptation algorithm of the media encoder in response to the encoder becoming overloaded.

1. The pipeline configurator signals (202) the packetizer so as to cause that processing module to enter its trigger mode. The packetizer is passed only the updated maximum packet size parameter.
2. The pipeline configurator signals (203) the encoder module so as to cause that processing module to enter its trigger mode. The encoder is passed only the updated pixel dimensions, frame rate, bitrate and NAL size parameters.
3. The pipeline configurator signals (204) the preprocessor so as to cause the preprocessor to enter immediate mode. The preprocessor is passed the updated pixel dimensions and frame rate parameter.
4. The preprocessor adopts its updated encode parameters (205) and rescales the next video frame to pixel dimensions of 320×240 and regulates the frame rate to 20 fps. The preprocessor also sets a trigger flag in that first video frame processed according to the updated encode parameters.
5. On receiving the first video frame, the encoder module detects the trigger flag (206) and immediately switches to encoding that first video frame using its updated encode parameters—i.e. by encoding frames of the updated size and frame rate at the updated bitrate of 256 kbps. The encoder module passes the encoded first video frame with the buffer flag still set onto the packetizer.
6. On receiving the first video frame, the packetizer detects the trigger flag (207) and immediately switches to packetizing that first video frame using its updated encode parameters—i.e. by outputting data packets 600 bytes in size.
7. Finally, the packetizer issues a callback to the pipeline configurator to signal completion of pipeline configuration (208).

The updated encode parameters could be made available to the modules of the encoder pipeline in any suitable manner. For example, the pipeline configurator could pass the updated encode parameters to each of the modules in the pipeline when it signals each of those modules. The pipeline configurator could be configured to pass to each module only those encode parameters that are required by that module. Alternatively, the updated encode parameters could be stored at a location accessible to the modules of the encoder pipeline, with each of the modules being configured to retrieve the updated encode parameters on entering immediate or trigger mode.

In trigger mode, a module is preferably configured to cache a copy of the updated encode parameters (or at least those relevant to it) so as to allow the module to immediately switch to performing processing with the updated encode parameters on receiving a frame with a trigger flag.

It can be advantageous to arrange that the first processing module further associates the trigger flag with buffers subsequent to the first buffer in the stream. This helps to ensure that the trigger flag is received at subsequent processing modules in the case that the first buffer containing the trigger flag is lost or discarded (possibly intentionally, say due to frame skip logic commonly employed in encoder bit rate control algorithms) in the pipeline. For example, a first buffer might be discarded at the encoder should the encoder encounter certain types of error on encoding that buffer. If the trigger flag were only in the first buffer then the packetizer would not receive the trigger flag and would not therefore switch encoding modes. As a result, the packetizer would process subsequent buffers according to the previous encoding configuration, whilst the preprocessor and encoder would process those same buffers according to the updated encoding configuration.

One way of arranging that buffers subsequent to a first buffer in a media stream can propagate an encoder switch through the encoding pipeline is by using a trigger flag that can be toggled between two or more states. On an encoder configuration switch occurring and the first processing module entering its immediate mode, the first processing module toggles the state of the trigger flag. The first processing module includes the toggled trigger flag in the first and subsequent buffers of the stream being processed at the pipeline: it could associate the trigger flag with every buffer it processes or a predetermined number of buffers following an encoder switch. In their trigger modes, the subsequent processing modules of the pipeline (or at least those which can perform a configuration switch) are configured to store the state of the last received trigger flag and to switch encode configuration on receiving a trigger flag whose state differs from the stored state. By this arrangement, the subsequent modules can reliably switch encode configurations even if the first buffer is lost.

For example, with reference to FIG. 1, on entering immediate mode the preprocessor is configured to toggle a stored trigger flag from state 1 to state 2. The trigger flags stored at the encoder and packetizer are both in state 1 since this state relates to the current encode configuration. The preprocessor associates the trigger flag in state 2 with the first buffer it processes according to the new encode configuration. When the encoder receives that first buffer it checks the state of the trigger flag and, because the state of the trigger flag differs from its currently stored state, switches encode configurations and can leave trigger mode. The encoder further toggles its stored trigger flag from state 1 to state 2. If, on attempting to encode the first buffer, the encoder encounters an error and discards the buffer, the packetizer will not receive the first buffer and so will not yet switch its encode configuration. However, on receiving a second buffer in the stream (e.g. a buffer which was successfully encoded at the encoder), the packetizer is then triggered to switch encode configurations because its stored trigger flag is still in state 1 and does not yet match the received trigger flag which is in state 2. The packetizer then toggles its stored trigger flag state and can leave trigger mode.

In order to inform the pipeline configurator that the configuration switch has been completed, it is advantageous to arrange that the last module in the pipeline (the packetizer in this example) signals to the pipeline configurator to indicate that it has adopted the updated configuration, as indicated by signal path 112 in FIG. 1. This information can help the pipeline configurator to avoid initiating a second configuration switch before the first is complete, and can alert the pipeline configurator to an unresponsive pipeline (e.g. if it does not receive a completion signal from the packetizer within a predetermined period of time).

The terms media buffer and media frame are used herein to refer to data that relates to an input buffer/frame received for processing at the media encoder. As a buffer/frame passes along the pipeline and is processed at each processing module, the data representing that buffer/frame is likely to be modified. For example, the data received at the input of the packetizer of FIG. 1 in respect of an input video frame will differ to the data received at the input of the encoder module in respect of that video frame because the encoder module processes the video frames into an encoded media stream. However, at each point along the encoder pipeline data can be said to represent a given input media buffer/frame and can therefore be consistently referred to as "the media buffer" or "the media frame".

In FIG. 1, a media encoder having only one data path through its pipeline is shown. More generally the pipeline of the media encoder could have any number of data paths or parallel pipelines to which the mechanisms described herein can be extended.

It is to be further understood that any connections shown in the figures between the pipeline configurator and the processing modules of the pipeline are schematic only and do not necessarily indicate a direct signal path between the configurator and the modules. The pipeline configurator could communicate with the processing modules by any suitable means. This could be by means of, for example, a direct signal path between the configurator and the modules, a common data bus, or by means of signals embedded in buffers or their metadata which pass along the pipeline.

It is sometimes the case that encoders (e.g. encoder module 104 in FIG. 1) suffer from unacceptable latencies when performing dynamic switching of frame size. As will now be described, when a media encoder is based around an encoder module that cannot efficiently perform dynamic switching of frame size, the preprocessor can be arranged to process the incoming video frames so as to allow the encoder module to operate on frames of constant size. This negates the issues experienced by the encoder when a dynamic switch of frame size is demanded.

The size of a frame is determined by its pixel dimensions, that is the number of pixels along each dimension of the two-dimensional frame. For example, a video frame having a size of 640×480 has 640 pixels along its first dimension, and 480 pixels along its second dimension. Where frames employ channel subsampling such that one or more channels of the image have different resolutions, the pixel dimensions refer to the greatest pixel dimensions of the channels and/or the pixel dimensions of the luma channel. For example, for YUV frames, the pixel dimensions are those of the Y channel.

Figure 3:
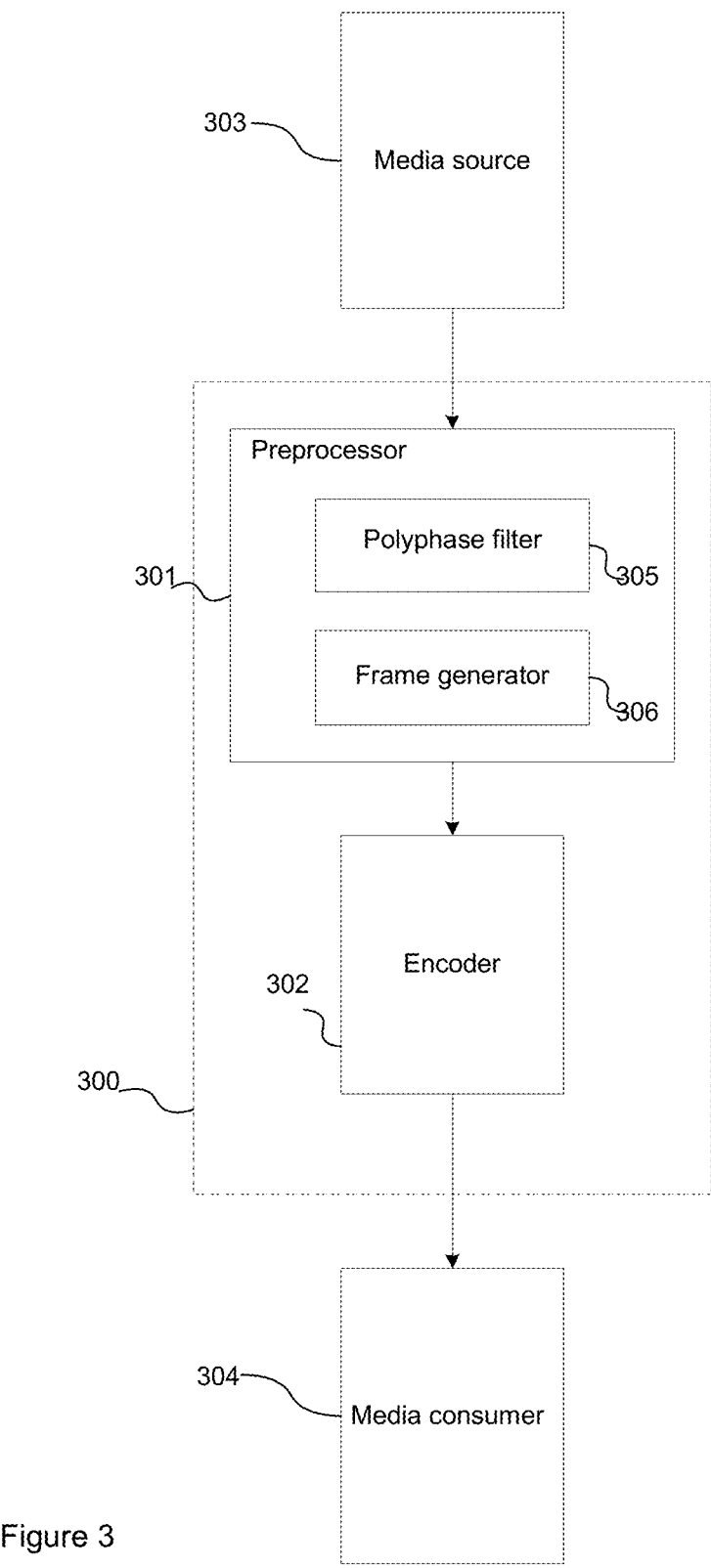
FIG. 3 is a schematic diagram of a media encoder having a preprocessor configured to output video frames of fixed size.

FIG. 3 is a schematic diagram of a media encoder 300 comprising a preprocessor 301 and encoder module 302. The media encoder is shown in context as part of a data processing system comprising a media source 303 and media consumer 304. The media encoder receives video frames from the media source (e.g. a camera) and provides encoded frames to a media consumer (e.g. a transmitter for transmitting the frames over a network). More generally the preprocessor can be any kind of frame processor arranged prior to the encoder module in the processing pipeline of the media encoder.

The preprocessor is configured to rescale video frames received from the media source so as to ensure that the received video frames fit within output frames of a constant size at which the encoder module is configured to operate. In FIG. 3, the rescaling is performed at a polyphase filter 305 of the preprocessor, but any other suitable kind of rescaling filter could be used (e.g. a bilinear filter, a bicubic filter, a Lanczos resampling filter, or a spline interpolation filter). For example, if the preprocessor receives a video frame having one or both pixel dimensions greater than the respective dimension(s) of the fixed output frame size, the frame is rescaled without changing the aspect ratio of the frame such that the frame fits within an output frame. The frame is preferably rescaled so that one or both of the dimensions of the frame are equal to the respective dimensions of the output frame. A frame generator 306 of the preprocessor then generates an output frame of the fixed frame size and embeds the received video frame in the output frame. The frame generator could either modify the received and possibly rescaled video frame to form an output frame of the fixed frame size comprising the embedded frame, or it could form a new output frame into which the received and possibly rescaled video frame is embedded.

Each received video frame is rescaled such that the received frame (the "active area") fits into the new frame without rotation of the received frame. Any pixels of the new frame which do not represent the received frame (i.e. lie outside the "active area" in the new frame) can be set to a constant pixel colour, preferably black, so that those pixels can be subsequently identified as being outside the active area (e.g. on decoding at a decoder). Black is a good choice because for many video frames this will represent a strong contrast with the active area and allow the active area to be readily identified and extracted from the frame at a receiver. Alternatively or additionally, the preprocessor can mark those pixels outside the active area by writing information to the frame (e.g. a header) or associated metadata to indicate the position and dimensions of the active area in the output frame. For example, for a stream being transmitted over a network in accordance with the Realtime Transport Protocol (RTP) protocol, such information could be included in an RTP header (e.g. an extension header of the protocol). This can be achieved by passing information indicating the position and dimensions of the active area in the output frame to an entity (e.g. media consumer 304) forming the network packets for transmission.

In another example, encoding is performed in accordance with the H.264 standard and information indicating the position and dimensions of the active area could also be passed to a decoder by including modified crop information in a Sequence Parameter Set (SPS) associated with one or more frames. This could be achieved by enabling the frame_cropping_flag and altering the frame_crop_left_offset, frame_crop_right_offset, frame_crop_top_offset, and frame_crop_bottom_offset parameters so as to cause a decoder enabled to make use of such SPS parameters to crop the frame to the active area. A consequence of including information relating to the active resolution in SPS parameters is that any change in active resolution must be accompanied by a new set of SPS parameters, a new Picture Parameter Set (PPS) and an Instantaneous Decoder Refresh (IDR).

Figure 4:
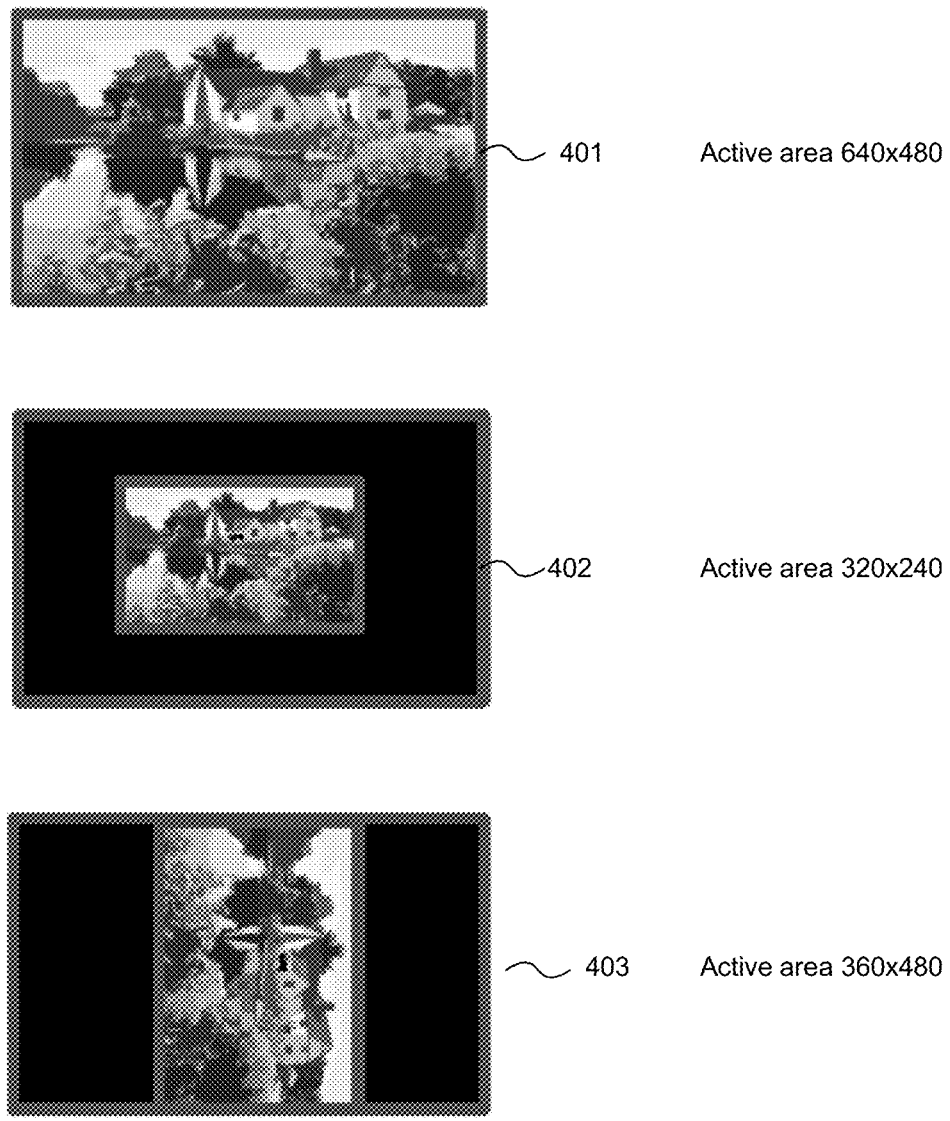
FIG. 4 shows example frames generated by a preprocessor.

Three example output frames of fixed size 640×480 pixels generated by the preprocessor from received frames of various sizes are shown in FIG. 4. In the case the preprocessor receives a video frame of size 640×480 (i.e. equal to that of the predetermined size), the active area fills the entire output frame, as shown in 401. Such received frames can be passed by the preprocessor without processing of the present nature being performed (other preprocessing of the received frame could be performed). In the case the preprocessor receives a video frame of size 320×240, the frame is embedded in an output frame, optionally without rescaling. In 402 the received frame is shown as an active area at the centre of the output frame, but more generally the video frame could be embedded at any point in the frame (e.g. in the top-left corner), subject to further considerations explained below. In alternative embodiments, the preprocessor could be configured to rescale video frames having both pixel dimensions smaller than the respective pixel dimensions of the output frame size so as to provide a rescaled frame having one or both pixel dimensions equal to the pixel dimensions of the output frame size for embedding in an output frame. Rescaling is performed without modifying the aspect ratio of the received frame.

In the case that the preprocessor receives a video frame of 480×640 the preprocessor rescales the received video frame without rotation such that the video frame fits within the bounds of a fixed-size output frame—i.e. the received video frame is rescaled to 360×480. This is shown at 403 of FIG. 4. Thus, if the preprocessor receives any video frames having a pixel dimension larger than the predetermined output size, the preprocessor rescales those frames so as to fit those frames within the bounds of an output frame.

Figure 5:
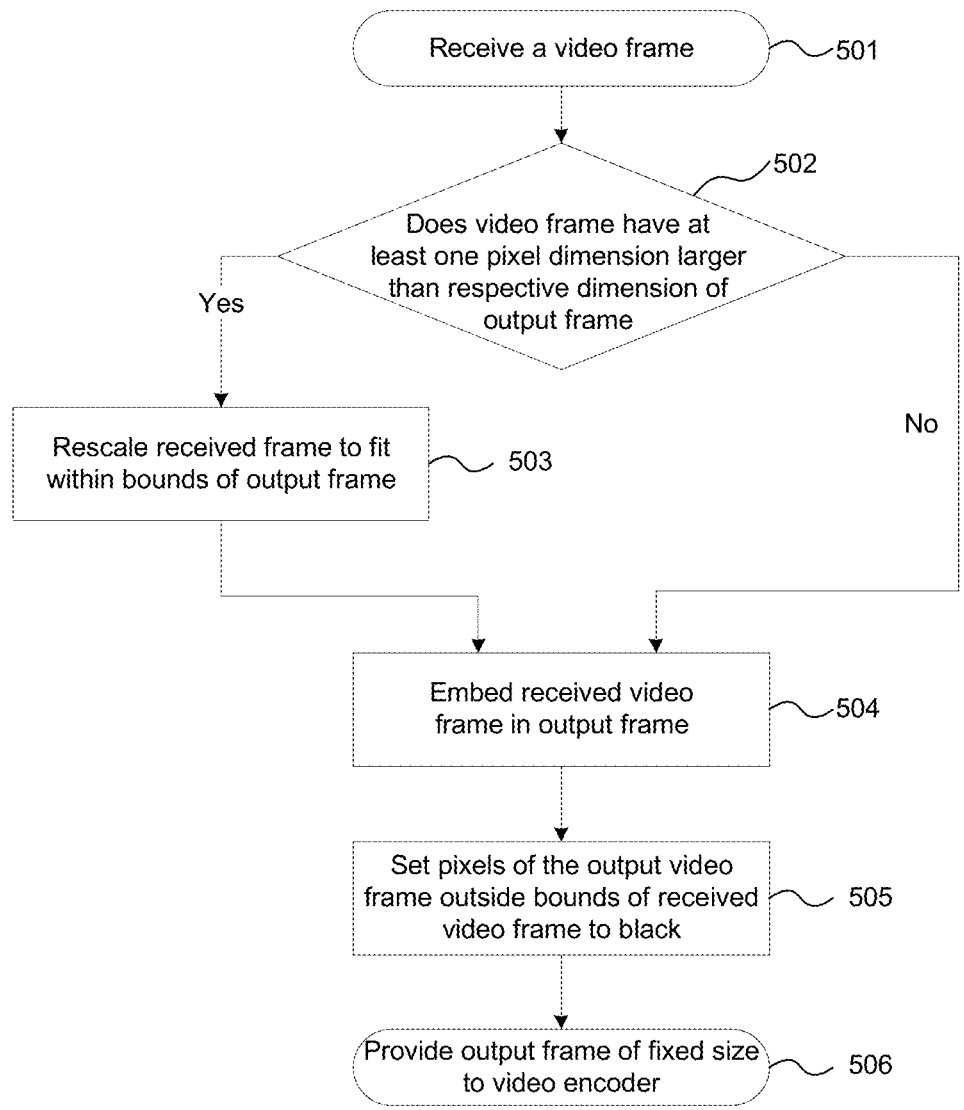
FIG. 5 is a flow diagram of a frame processing by the preprocessor.

The process performed by the preprocessor in the present example is illustrated in the flowchart of FIG. 5. Consider the example shown in 403 of FIG. 4. At 501 a video frame of size 480×640 is received. Since the second pixel dimension of 640 is greater than the corresponding second dimension of the fixed output size of 640×480 (decision box 502), the received frame is rescaled to fit within the bounds of the output frame (503). The rescaled frame is then embedded in an output frame at 504 20 and at 505 the pixels in the areas outside the active area represented by the rescaled received frame are set to the colour black (see the black bands either side of the active area in 503). The output frame of fixed size 640×480 so formed is provided to the encoder module which is therefore not required to switch frame size between video frames, as shown at 506.

Rescaling of frames by the preprocessor can be performed by any suitable rescaling technique. In order to strike a balance between rescaling quality and use of resources by the preprocessor (e.g. consumption of processor cycles in the event the preprocessor is software supported at a CPU), it can be advantageous to configure the preprocessor to make use of lower quality, less computationally-intensive rescaling technique for small rescaling factors and a higher quality, more computationally-intensive rescaling technique for larger rescaling factors. This can be achieved through the use of a polyphase filter and controlling the number of coefficients such that the number of coefficients is at least approximately greater than or equal to the downscaling ratio, with a minimum number of two coefficients corresponding to bilinear rescaling. Thus, for example, for a rescaling factor of less than 1.5 (1.5 referring to the factor by which each pixel dimension of a frame is divided) two coefficients are used, corresponding to a bilinear rescaling technique. For rescaling factors of greater than 1.5 a polyphase rescaling technique having more than two coefficients could be used: values of 3, 5 and 7 typically provide sufficient flexibility, with 3 coefficients being used for rescaling factors between 1.5 and 3; 5 coefficients being used for rescaling factors between 3 and 5; and 7 coefficients being used for rescaling factors greater than 5.

Implementations of the preprocessor might, for example, operate on YUV frames generated in accordance with a chroma subsampling scheme. For example, YUV frames with pixel dimensions of 640×480 generated with a 4:2:0 subsampling scheme would have Y dimensions of 640×480 but U and V dimensions of 320×240. Rescaling can be independently performed on each channel of a frame. In the examples above the number of coefficients is determined according to the pixel dimensions of frames and therefore applies to the rescaling of luma information (e.g. the Y channel of YUV frames). In the event that frames are generated in accordance with a chroma subsampling scheme, each chroma channel can be rescaled using a number of filter coefficients calculated by dividing the number of filter coefficients determined for the luma channel by the respective subsampling ratio for the chroma channel. If the calculation results in a non-integer number of coefficients, the calculated number of coefficients is rounded up to the next highest integer for use in the polyphase filter for the respective chroma channel. For example, in the case that 5 coefficients are used to rescale a luma channel of a YUV frame having 4:2:0 chroma subsampling, then the subsampling ratio for the U and V channels is 2 and the calculation suggests 2.5 filter coefficients should be used for rescaling the U and V channels. This is rounded up to the next integer so that 3 filter coefficients are used to rescale the U and V channels.

It should be noted that rescaling using a rescaling filter can be performed first with respect to one dimension of a frame, and subsequently with respect to a second dimension of the frame. Rescaling can be performed first in a vertical direction, followed by a horizontal direction.

Using a preprocessor configured in accordance with this mechanism leads to a small additional encoding overhead in cases when the received frame does not match the dimensions of the output frame. This is due to the encoding of pixels outside the active area of the output frame which do not carry any image information. However, the mechanism is an acceptable trade-off in systems in which the encoder would otherwise be required to perform costly frame size switches (e.g. due to adaptation of the encoder to load or network conditions).

The preprocessor could be arranged in an encoder pipeline with an encoder module configured to perform encoding according to a video standard that divides an incoming frame into macroblocks. In this case, on embedding a received frame in an output frame, it is preferable that at least two adjacent boundaries of the received frame/active area are aligned with boundaries of those macroblocks in the output frame through appropriate location of the received frame in the output frame. This helps to minimise the number of macroblocks processed at the encoder that contain a mix of active and inactive regions, which leads to a lower encoding efficiency and can cause bleeding of the image information into the inactive areas of the output frame. It is further advantageous if all four boundaries of the received frame can be aligned with macroblock boundaries. This can be achieved through appropriate rescaling or trimming of the received frame at the preprocessor so that the dimensions of the active area are an integer multiple of the macroblock size (typically 16 pixels).

When the encoded output frames are received at a decoder, the decoder can be arranged to identify the active area that represents the original source video frame in any suitable manner. It is preferred that information is passed with the output frame (e.g. in its header or associated metadata, such as an RTP header or SPS parameters) indicating the position and size of the active area in that output frame. This avoids the decoder having to process the frame to identify the active area. Alternatively, the decoder processes each frame to identify the active area—for example, by identifying boundaries between the areas of constant colour outside the active area and the typically variable colour information within the active area.

Preprocessor 301 described with respect to FIG. 3 could be used in place of preprocessor 103 of FIG. 1. By employing a preprocessor that provides frames of constant size to the encoder, the dynamic switching mechanism described with respect to FIGS. 1 and 2 can be used with an encoder module that cannot perform seamless switching of frame size whilst encoding a stream of video frames.

The data processing systems of FIGS. 1 and 3 are shown as comprising a number of functional blocks. This is for illustrative purposes only and is not intended to define a strict division between different parts of hardware on a chip or between different programs, procedures or functions in software.

In the particular examples described herein, a frame is a frame of a video stream. A video stream could be encoded according to, for example, an MPEG or ITU standard, such as H.264. More generally however, a frame is any portion of media data, such as a portion of an audio stream.

Data processing systems configured in accordance with the present invention could be embodied in hardware, software or any suitable combination of hardware and software. A data processing system of the present invention could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing system, and/or heterogeneous processors comprising one or more dedicated, programmable and general purpose processing functionalities. In preferred embodiments of the present invention, data processing systems comprise one or more processors and one or more memories having program code stored thereon, the data processors and the memories being such as to, in combination, provide the claimed data processing systems and/or perform the claimed methods.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the data processing methods described herein could be performed by one or more physical processing units executing program code that causes the unit(s) to perform the data processing methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A media encoder for encoding a stream of media data blocks, the media encoder comprising:
   an encoder pipeline configured to process a stream of media data blocks in accordance with one or more first encode parameters, the encoder pipeline comprising a sequence of processing modules including a first processing module and one or more subsequent processing modules; and
   a pipeline configurator configured to, in order to effect a switch in the encoder pipeline from the one or more first encode parameters to one or more second encode parameters, cause the subsequent processing modules of the pipeline to enter a trigger mode and cause the first processing module to adopt the second encode parameters;
   the first processing module being configured to, on adopting the second encode parameters, associate a trigger value with at least a first media data block processed at the first processing module in accordance with the second encode parameters; and
   in trigger mode, each of the subsequent processing modules being configured to, in response to receiving the trigger value, adopt the second encode parameters.

2. A media encoder as claimed in claim 1, the first media data block being the first media data block for processing at the first processing module in accordance with the second encode parameters.

3. A media encoder as claimed in claim 1, wherein the first processing module is configured to, on being caused to adopt the second encode parameters, complete any current processing according to the first set of encode parameters and process the next media data block received for processing at the first processing module in accordance with the second set of encode parameters, that next media data block being the first media data block.

4. A media encoder as claimed in claim 1, the pipeline configurator being configured to cause the subsequent processing modules of the pipeline to enter their trigger modes prior to causing the first processing module to adopt the second encode parameters.

5. A media encoder as claimed in claim 1, the pipeline configurator being configured to cause the subsequent processing modules of the pipeline to enter their trigger modes in reverse order with respect to the order of the subsequent processing modules in the pipeline.

6. A media encoder as claimed in claim 1, the pipeline configurator being configured to, on causing the subsequent processing modules of the pipeline to enter a trigger mode, make available at least some of the second encode parameters to the subsequent modules.

7. A media encoder as claimed in claim 6, the subsequent processing modules of the pipeline being configured to cache the at least some of the second encode parameters for adoption on receiving the trigger value.

8. A media encoder as claimed in claim 1, the pipeline configurator being configured to, on causing the first processing module to adopt the second encode parameters, make available at least some of the second encode parameters to the first processing module.

9. A media encoder as claimed in claim 1, the trigger value being a state of a trigger flag that is toggled between two or more states and:
   the first processing module is configured to, on adopting the second encode parameters, toggle the state of the trigger flag from a first state to a second state and include the toggled trigger flag in the first and subsequent media data blocks of the stream; and the subsequent modules are configured to, in trigger mode, maintain the state of the last received trigger flag and adopt the second encode parameters in response to receiving the trigger value only if the trigger value differs from the maintained state.

10. A media encoder as claimed in claim 1, the first processing module being configured to write the trigger value to the at least the first media data blocks or metadata associated with the at least the first media data blocks.

11. A media encoder as claimed in claim 1, the first processing module being a preprocessor for processing media data blocks prior to their encoding at an encoder of the encoder pipeline.

12. A media encoder as claimed in claim 1, one or more of the subsequent modules being an encoder for encoding media data blocks.

13. A media encoder as claimed in claim 1, wherein the media data blocks are video frames and the first and second encode parameters include one or more of frame size, frame rate and bitrate.

14. A method of switching encode configurations at an encoder pipeline for processing a stream of media data blocks in accordance with one or more encode parameters, the encoder pipeline comprising a sequence of processing modules including a first processing module and one or more subsequent processing modules, the method comprising, in order to switch the encoder pipeline from one or more first encode parameters to one or more second encode parameters:

causing the subsequent processing modules of the pipeline to enter a trigger mode;

causing the first processing module of the pipeline to adopt the second encode parameters;

the first processing module, on adopting the second encode parameters:

associating a trigger flag with at least a first media data block processed at the first processing module in accordance with the second encode parameters; and each of the subsequent processing modules in response to receiving the trigger flag associated with the first media data block:

adopting the second encode parameters; and processing the first media data block in accordance with the second encode parameters.

15. A non-transitory computer readable storage medium having stored thereon computer readable instructions that, when executed at a computer system for generating a representation of a digital circuit from definitions of circuit elements and data defining rules for combining those circuit elements, cause the computer system to:

generate an encoder pipeline configured to process a stream of media data blocks in accordance with one or more first encode parameters, the encoder pipeline comprising a sequence of processing modules including a first processing module and one or more subsequent processing modules; and generate a pipeline configurator configured to, in order to effect a switch in the encoder pipeline from the one or more first encode parameters to one or more second encode parameters, cause the subsequent processing modules of the pipeline to enter a trigger mode and cause the first processing module to adopt the second encode parameters;

the first processing module being configured to, on adopting the second encode parameters, associate a trigger value with at least a first media data block processed at the first processing module in accordance with the second encode parameters; and in trigger mode, each of the subsequent processing modules being configured to, in response to receiving the trigger value, adopt the second encode parameters.

16. A non-transitory computer readable storage medium having stored thereon computer executable instructions that when executed cause at least one processor to switch an encoder pipeline from one or more first encode parameters to one or more second encode parameters for encoding a stream of media data blocks, by:

causing subsequent processing modules subsequent to a first processing module of the pipeline to enter a trigger mode;

causing the first processing module of the pipeline to adopt the second encode parameters, the first processing module, on adopting the second encode parameters, associating a trigger flag with at least a first media data block processed at the first processing module in accordance with the second encode parameters; and each of the subsequent processing modules in response to receiving the trigger flag associated with the first media data block, adopting the second encode parameters; and processing the first media data block in accordance with the second encode parameters.

* * * * *